United States Patent [19]
Hubans

[11] Patent Number: 5,233,304
[45] Date of Patent: Aug. 3, 1993

[54] ELECTROMAGNETIC SOURCE INTEGRATED INTO AN ELEMENT OF A WELL CASING

[75] Inventor: Christian Hubans, Pau, France

[73] Assignee: Societe Nationale Elf Aquitaine (Production), Courbevoie, France

[21] Appl. No.: 606,158

[22] Filed: Oct. 31, 1990

[30] Foreign Application Priority Data
Nov. 15, 1989 [FR] France ................. 89 14960

[51] Int. Cl.$^5$ .............. G01V 3/28; E21B 49/00; E21B 41/00
[52] U.S. Cl. .................. 324/323; 166/66.5; 166/242; 324/333; 324/339; 324/346
[58] Field of Search ........... 324/323, 333, 338, 339, 324/340-342, 346, 356, 368, 369; 166/242, 250, 254, 255, 66.5

[56] References Cited
U.S. PATENT DOCUMENTS

| | | | |
|---|---|---|---|
| 3,057,409 | 10/1962 | Grossman, Jr. | 324/368 X |
| 3,408,561 | 10/1968 | Redwine et al. | 324/342 |
| 4,529,939 | 7/1985 | Kuckes | 324/346 |
| 4,593,770 | 6/1986 | Hoehn, Jr. | 324/346 X |
| 4,651,101 | 3/1987 | Barber et al. | 324/339 |
| 4,785,247 | 11/1988 | Meador et al. | 324/338 |
| 4,802,534 | 2/1989 | Larson et al. | 166/66.5 X |
| 4,901,023 | 2/1990 | Vail, III | 324/346 X |
| 4,933,640 | 6/1990 | Kuckes | 324/346 X |

Primary Examiner—Gerard R. Strecker

[57] ABSTRACT

Electromagnetic source intended to be placed permanently in a drill well for studying the electromagnetic properties of the geological formations or of the fluids surrounding the well. This source consists of a coil through which a high current is circulated and which is of a diameter of the order of magnitude of the diameter of the well and is integrated in one of the elements of the casing produced at least partially from a resistant material in which the coil is embedded. This source can either be activated directly by a conductor shoe moving along in the well or be connected to a supply by means of cables.

21 Claims, 2 Drawing Sheets

ELECTROMAGNETIC SOURCE INTEGRATED INTO AN ELEMENT OF A WELL CASING

BACKGROUND OF THE INVENTION

The invention relates to an electromagnetic source for a well, forming a permanent casing element, for studying properties of the geological formations or of the fluids in the vicinity of the source.

The variations of an electromagnetic field are characteristic of the geological formations through which this field passes and of the fluids which they contain. In petroleum or mining exploration, for studying the electromagnetic properties of the geological formations through which a drill well passes, it is customary to emit an electromagnetic field from an electromagnetic source lowered into the well and located at a specific point, and to measure this field at other specific points of the well so that the intervals between the source and the receivers located at the measuring points are variable. Similar techniques involve measuring the field at points located on the surface of the ground or even along a second well. The sources conventionally consist of coils, through which circulates a current provided by an electrical supply and which are lowered into the well by means of a cable. The measurements are most often carried out after the casing of the well or wells.

Such sources have disadvantages. In particular, the casing acts as a screen, the effect of this being to limit the radius of investigation of the measuring device and making necessary, as compensation, to increase the power of the current circulating in the emitter coil. Another disadvantage is that the use of such sources requires the temporary immobilisation of the well and allows only a paintwise investigation of the formations.

SUMMARY OF THE INVENTION

The invention provides an electromagnetic source for a well, making it possible to overcome the inadequacies of the systems described above.

The electromagnetic source according to the invention, for studying the electromagnetic properties of the geological formations or of the fluids in the vicinity of a cased well in petroleum or mining exploration or working, consists, on the one hand, of a solenoid conductor coil which is inscribed within a cylinder of a diameter smaller than the outside diameter of the casing and larger than the inside diameter of the casing and which is embedded in an insulating sleeve forming an integral part of one of the elements of the casing.

The upper and lower ends of the coil are connected to activating means allowing an electrical current to pass through the coil.

The ends of the coil can, for example, be in electrical contact, one with an upper casing element directly above the casing element in which the coil is integrated and the other, with a lower casing element directly below, these two casing elements being at least partially conductive.

In this case, the activating means can consist of a shoe which can be lowered into the well and which makes it possible to connect the upper and lower conductive elements of the casing to a current supply.

Advantageously, the casing element in which the coil is integrated consists partially of a tubular metal element which is located inside the coil and which functions as a core for the coil.

According to a preferred embodiment, the shoe comprises at least two conductor studs spaced at a distance equal to the distance between the lower and upper conductive elements of the casing and each connected to one of the poles of an electrical supply.

Advantageously, the shoe has engaging means making it possible to put the studs in contact with the upper and lower conductive elements.

In another embodiment, the activating means consist of a pair of conductor wires connecting each of the ends of the coil, one to the positive pole of an electrical supply and the other, to the negative pole of this same supply.

As mentioned above, the electromagnetic source according to the invention is integrated in the casing. Such a permanent source makes it possible to carry out repetitive measurements in time, without the need to dismantle the well. A plurality of sources of the type according to the invention can be integrated in the same casing in specific positions. The casing having such a multiple electromagnetic source then consists of a succession of ordinary casing elements and of elements in which at least one source according to the invention is integrated. This possibility increases the number of feasible measuring processes: for example, a multiple source can thus be provided, without having to multiply the number of cables in the tubing.

Further characteristics and advantages of the electromagnetic source according to the invention for studying the geological formations surrounding a well will emerge from a reading of the following description of a particular embodiment of the said source given by way of non-limiting illustration.

DESCRIPTION OF THE PREFERRED EMBODIMENTS

Figure 1:
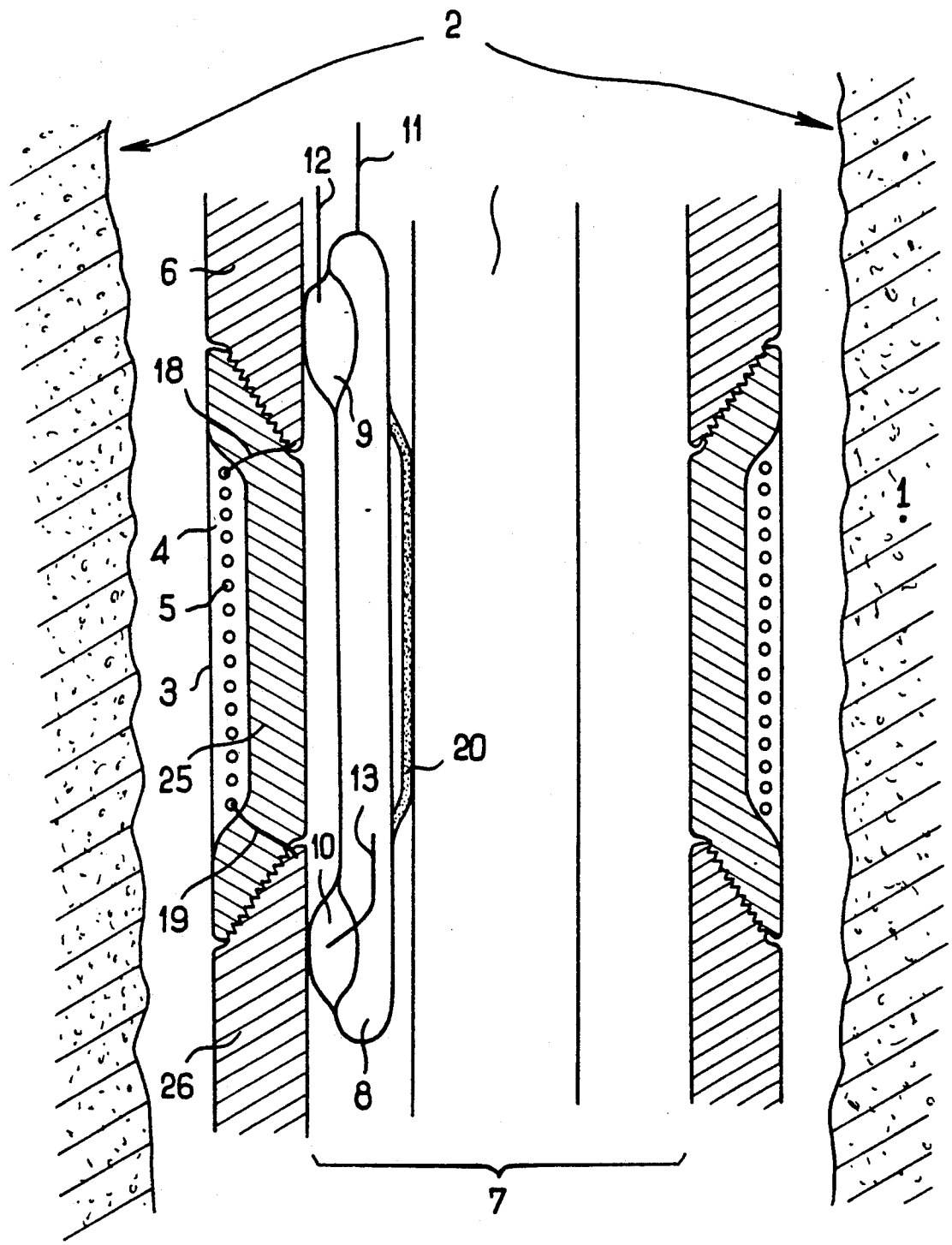
FIG. 1 shows diagrammatically, in section in a longitudinal axial plane, a source according to the invention in place in a tubed well and its activating shoe.

Referring to FIG. 1, the electromagnetic source according to the invention for studying the electromagnetic properties of the geological formations 1 and of the fluids in the vicinity of the well represented by its walls 2 cased by means of a casing 7 comprises a conductor wire coil 5 embedded in an insulating sleeve 4.

The diameter of the wire of the coil and its length are defined as a function of the characteristics of the desired field.

This coil is integrated in a casing element 3 mounted in the usual way by screwing to the lower and upper conductive casing elements 26, 6.

The mounting is such that the only electrical contact between the elements 26, 6 and 3 is made by means of the ends 18 and 19 of the coil 5, so that, if the upper conductive element 6 is connected to the positive pole of a current supply and the lower element 26 is connected to the negative pole of this same supply, there is a passage of the current in the region of the element 3 through the coil only. If the lower and upper elements are not connected to a current supply, no primary current circulates in the coil which is thus passive. The coil can be activated by means of a shoe 8 which is suspended on the end of a cable 11 connected to a winch (not shown) at the surface and which, as a result of the actuation of the winch, is lowered into the well containing the central element 3 according to the invention. For example, if the well is tubed, the shoe 8 is lowered into the annular space contained between the casing 7 and a tubing 14. The shoe 8 comprises two conductor studs 9 and 10 which function as electrodes and which are separated by means of an insulating material and are distant from one another by a length slightly greater than the length of the central element 3, so that there is at least one position of the shoe which is such that the upper stud 9 is in contact with the upper casing element 6 and the lower stud 10 is in contact with the lower casing element 26. The stud 9 is connected by means of a conductor cable 12 to the positive pole of a current supply, while the stud 10 is connected by means of a conductor cable 13 to the negative pole of this same supply. It is thus possible to establish a closed electrical circuit between the supply and the coil by way of the studs and the lower and upper casing elements.

The shoe is equipped with a bow-shaped springleaf 20 arranged symmetrically relative to the studs, in such a way that the leaf bears on the body of the tubing 14 while the studs are in contact with the casing. The shoe descends in the well by its own weight and is raised by pulling on a cable 11 connecting the shoe to a winch located at the surface.

Figure 2:
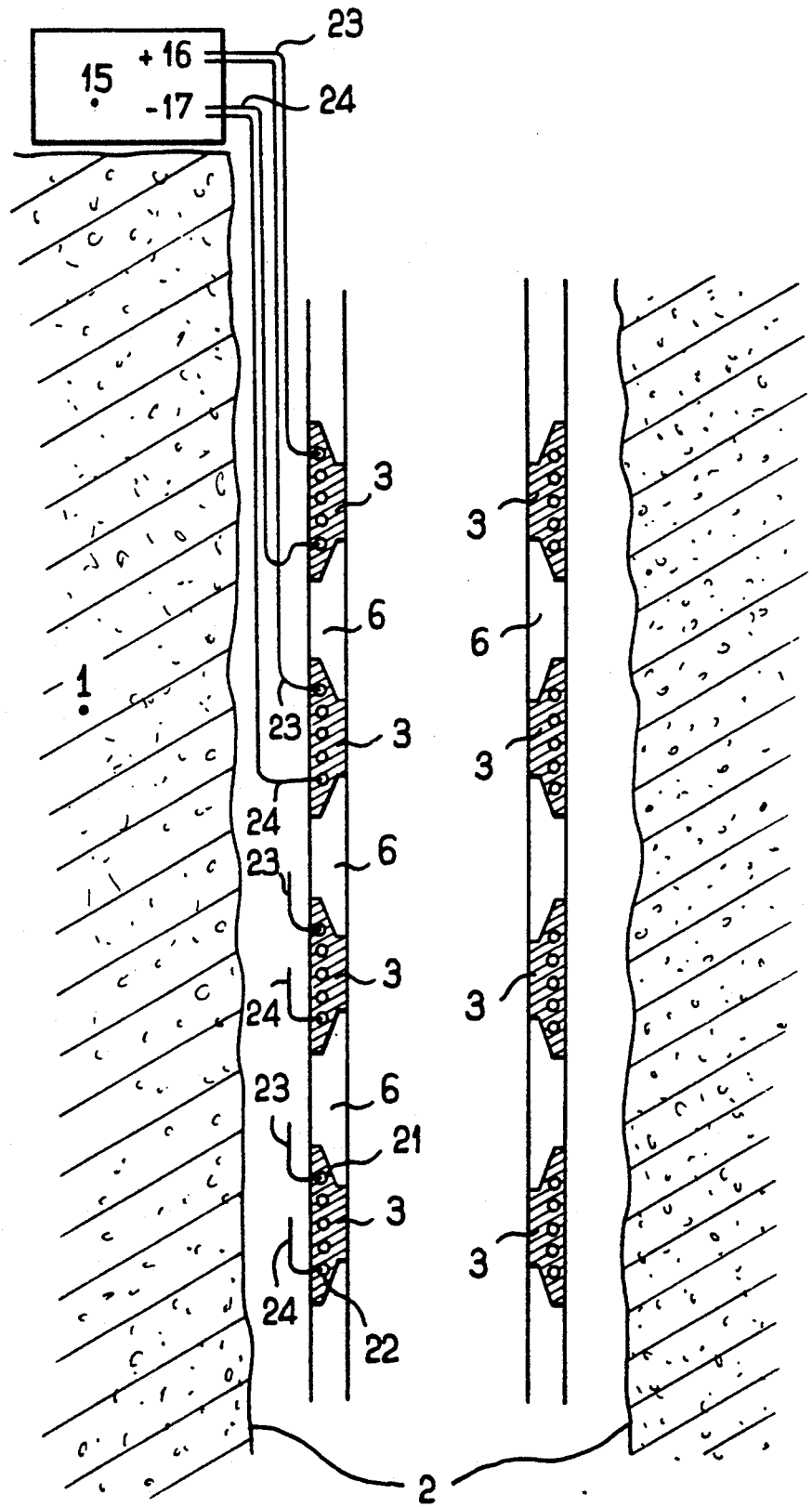
FIG. 2 shows diagrammatically, in section in a longitudinal axial plane, a multiple electromagnetic source according to the invention with a method of activation by means of cables.

Another simple method, shown in FIG. 2, of activating the electromagnetic source according to the invention involves connecting, by means of conductor cables 23, 24 arranged, for example, permanently between the wall of the well 2 and the outside wall of the casing, each of the ends 21, 22 of the coil connected respectively to the positive and negative poles of a current supply 15 located at the surface, and not to the lower and upper casing elements.

The advantage of this in relation to the method of activation by means of a shoe is that it requires a lighter surface installation because, in this case, there is no need for a winching system.

The surface supply can consist of a signal synthesizer associated with an amplifier for generating the power.

The dimensions of the coil, and its length given the diameter of the wire and the conductive material used, are calculated as a function of the desired electromagnetic characteristics of the source, especially the moments, from relations well known to an average person skilled in electromagnetism, making it possible particularly to calculate the resistance $R_B$ of the coil. If the resistance $R_B$ is much lower (for example, if there is a ratio of the order of 1000) than the resistance $R_F$ of the medium surrounding the coil, the coil through which a current passes acts as a magnetic dipole. On the contrary, if the resistance of the coil is of the order of the resistance of the surrounding medium, the coil through which a current passes acts both as an electric dipole and as a magnetic dipole: it is therefore then a source with double polarization.

The central casing element in which the coil is embedded can be produced entirely from a single material. In this case, the latter must be mechanically or physically strong and electrically insulating, such as, for example, fiberglass. This central element can also be of two components and consist of a central core 25 shown in FIG. 1 and mechanically or physically strong and electrically conductive, for example made of steel, surrounded by a sleeve 4 which is made of insulating material and in which the coil is embedded. This latter embodiment has an advantage in so far as the part of the casing made of steel inside the coil has the effect of a core thus giving rise to an amplification of the emission moment of the source.

Thus, for a two-component central element, the current power necessary for obtaining a predetermined emission moment will be much lower (for example, in a ratio of 1 to 100) than the power necessary for obtaining this same moment with a central element not having a core.

It may be expedient to have a multiple electromagnetic source. FIG. 2 shows diagrammatically four electromagnetic sources according to the invention which are integrated in the casing and which are each connected to a current supply 15 located at the surface by means of as many conductor cable pairs (23, 24) arranged outside the casing. The sources can be activated simultaneously or in succession. The measurements are made in the conventional way at specific points by means of receiver coils lowered into the well by cable and connected, for example, to a receiver amplifier and a recorder located at the surface. The measurements can also be carried out at the surface or in a different well adjacent to the well in which the electromagnetic source or electromagnetic sources according to the invention are situated.

Of course, the invention is not limited to the embodiment described and illustrated, but on the contrary embraces the various alternative versions accessible to the specialist, while remaining within the scope of the invention.

What I claim is:

1. An electromagnetic field source device positioned between electrically conductive first and second segments of a tubular casing surrounding the tubing of a well for studying the electromagnetic properties of the geological formations or of the fluids in the vicinity of the well, comprising a tubular intermediate casing segment, said intermediate casing segment being disposed between the first and second casing segments and including a tubular insulating sleeve, said sleeve having a radially inner surface and a radially outer surface, and a solenoid conductor coil, said coil being substantially disposed within said insulating sleeve between said inner and outer surfaces, and activating means for supplying a varying electrical current to pass through said coil which causes said coil to emit an electromagnetic field for studying the electromagnetic properties.

2. The device according to claim 1, wherein said coil includes first and second ends, said first end being in electrical contact with the first casing segment and said second end being in electrical contact with the second casing segment, and said activating means includes a shoe, said shoe being disposable within the well between the tubing and the casing to connect the first and second casing segments to an electrical current supply.

3. The device according to claim 2, wherein said shoe includes at least two conductor stud portions spaced at a distance at least equal to the distance between the first and second casing segments, each of said stud portions being connected to one of the poles of said current supply, respectively.

4. The device according to claim 3, wherein said shoe further includes engaging means for engaging said stud portions with the first and second casing segments.

5. The device according to claim 8, wherein said activating means includes a pair of conductor wires connecting said first end to the positive pole of an electrical current supply and said second end to the negative pole of said supply.

6. The device according to claim 1, wherein said intermediate casing segment further includes a central tubular metal portion located radially inside said coil so as to function as a core for said coil.

7. A casing for a well forming a permanent electromagnetic source for the well, comprising at least one device according to claim 1.

8. An electromagnetic field source device positioned between first and second segments of the tubular casing surrounding the tubing of a well for studying the electromagnetic properties of the geological formations or of the fluids in the vicinity of the well, comprising a tubular intermediate casing segment, said intermediate casing segment being disposed between the first and second casing segments and including a tubular insulating sleeve, said sleeve having a radially inner surface and a radially outer surface, and solenoid conductor coil, said coil being substantially disposed within said insulating sleeve between said inner and outer surfaces and having first and second ends, and activating means for supplying a varying electrical current to pass through said coil which causes said coil to emit an electromagnetic field for studying the electromagnetic properties.

9. A casing for a well forming a permanent electromagnetic source for the well, comprising at least one device according to claim 6.

10. The device according to claim 6, wherein said coil includes first and second ends, said first end being in electrical contact with the first casing segment and said second end being in electrical contact with the second casing segment, and said activating means includes a shoe, said shoe being disposable within the well between the tubing and the casing to connect the first and second casing segments to an electrical current supply.

11. The device according to claim 10, wherein said shoe includes at least two conductor stud portions spaced at a distance at least equal to the distance between the first and second casing segments, each of said stud portions being connected to one of the poles of said current supply, respectively.

12. The device according to claim 11, wherein said shoe further includes engaging means for engaging said stud portions with the first and second casing segments.

13. The device according to claim 6, wherein said coil includes first and second ends and said activating means includes a pair of conductor wires connecting said first end to the positive pole of an electrical current supply and said second end to the negative pole of said supply.

14. A casing for a well forming a permanent electromagnetic source for the well, comprising at least one device according to claim 2.

15. A casing for a well forming a permanent electromagnetic source for the well, comprising at least one device according to claim 5.

16. A casing for a well forming a permanent electromagnetic source for the well, comprising at least one device according to claim 10.

17. A casing for a well forming a permanent electromagnetic source for the well, comprising at least one device according to claim 13.

18. An electromagnetic source device positioned between first and second segments of the tubular casing provided within a well for studying electromagnetic properties of the geological formations or of the fluids in the vicinity of the well, comprising a tubular intermediate casing segment, said intermediate casing segment being disposed between the first and second casing segments and including a tubular insulating sleeve, said sleeve having a radially inner surface and a radially outer surface, and a solenoid conductor coil said coil being substantially disposed within said insulating sleeve between said inner and outer surfaces and having first and second ends, and activating means for supplying a varying electrical current to pass through said coil which causes said coil to emit an electromagnetic field for studying the electromagnetic properties.

19. The device according to claim 18, wherein said intermediate casing segment further includes a central tubular metal portion located radially inside said coil so as to function as a core for said coil.

20. The device according to claim 18, wherein said activating means includes a pair of conductor wires connecting said first end to the positive pole of an electrical current supply and said second end to the negative pole of said supply.

21. The device according to claim 19, wherein said activating means includes a pair of conductor wires connecting said first end to the positive pole of an electrical current supply and said second end to the negative pole of said supply.

* * * * *